(12) United States Patent
Murata et al.

(10) Patent No.: US 11,804,875 B2
(45) Date of Patent: *Oct. 31, 2023

(54) WIRELESS POWER-TRANSMISSION APPARATUS AND WIRELESS POWER-TRANSMISSION METHOD

(71) Applicant: Kabushiki Kaisha Toshiba, Tokyo (JP)

(72) Inventors: Kentaro Murata, Ota (JP); Kohei Onizuka, Shinagawa (JP); Toshiya Mitomo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,549

(22) Filed: Jun. 3, 2022

(65) Prior Publication Data

US 2022/0302764 A1   Sep. 22, 2022

Related U.S. Application Data

(63) Continuation of application No. 16/295,578, filed on Mar. 7, 2019, now Pat. No. 11,374,435.

(30) Foreign Application Priority Data

Jul. 19, 2018  (JP) ................................ 2018-136006

(51) Int. Cl.
*H04B 5/00* (2006.01)
*H02J 50/23* (2016.01)
(Continued)

(52) U.S. Cl.
CPC ............ *H04B 5/0037* (2013.01); *H02J 50/23* (2016.02); *H02J 50/402* (2020.01); *H04B 7/0682* (2013.01)

(58) Field of Classification Search
CPC .................................................. H04B 5/0037
(Continued)

(56) References Cited

U.S. PATENT DOCUMENTS

| 11,374,435 B2 * | 6/2022 | Murata ............... H04B 7/0682 |
| 2011/0151789 A1 | 6/2011 | Viglione |
| 2018/0241255 A1 | 8/2018 | Leabman |

FOREIGN PATENT DOCUMENTS

| JP | 3616075 | 2/2005 |
| JP | 2008-283804 | 11/2008 |
| JP | 2014-193086 | 10/2014 |

OTHER PUBLICATIONS

Balanis, C. "Antenna theory: analysis and design", Third Edition, 2005, 3 pages.

(Continued)

*Primary Examiner* — Joseph Chang
(74) *Attorney, Agent, or Firm* — Oblon, McClelland, Maier & Neustadt, L.L.P.

(57) ABSTRACT

A wireless power-transmission apparatus includes at least one antenna element disposed at a specific position in a three-dimensional space having a predetermined shape and size, to transmit a power transmission beam, an acquirer to acquire an inclination angle of the antenna element to a plane direction of a reference plane and a height of the antenna element to the reference plane, and a controller to control at least one of antenna power and a power transmission direction of the power transmission beam so that interference power of the power transmission beam toward an outside of the three-dimensional space becomes equal to or smaller than a predetermined allowable value when the antenna element is disposed at the acquired inclination angle and height.

20 Claims, 9 Drawing Sheets

(51) Int. Cl.
*H04B 7/06* (2006.01)
*H02J 50/40* (2016.01)

(58) Field of Classification Search
USPC .......................................................... 307/104
See application file for complete search history.

(56) References Cited

OTHER PUBLICATIONS

"Guidance of the conformity check to the standard for electric wave protection", Ministry of Internal Affairs and Communications, 61 pages (with English Translation).

"Land Wireless-Communications Committee Report (Proposal)", Information and Telecommunications Council, The Information and Communication—Technology Subcommittee, 118 pages (with English Translation).

"The examination report about the frequency sharing of RLAN in a 5.8-GHz belt, and DSRC", ITSI Telecommunications System Promotion Meeting. 2016, 197 pages (with English Translation).

\* cited by examiner

FIG. 11

WIRELESS POWER-TRANSMISSION APPARATUS AND WIRELESS POWER-TRANSMISSION METHOD

CROSS REFERENCE TO RELATED APPLICATIONS

This application is a continuation of U.S. patent application Ser. No. 16/295,578, filed Mar. 7, 2019, which is based upon and claims the benefit of priority from the prior Japanese Patent Application No. 2018-136006, filed on Jul. 19, 2018, the entire contents of each of which are incorporated herein by reference.

FIELD

Embodiments of the present disclosure relate to a wireless power-transmission apparatus and a wireless power-transmission method.

BACKGROUND

A power-transmission beam direction control technique is known, which detects the position and posture of a power transmission satellite using a navigation sensor and controls a transmission method for a power transmission beam based on position information of a power reception facility.

In the above-described known power-transmission beam direction control technique, the influence of interference given to other wireless equipment from the power transmission beam is not considered. Therefore, the interference may be given to wireless communication of other wireless equipment present in the vicinity of a power receiver for receiving the power transmission beam.

DETAILED DESCRIPTION

According to the present embodiment, there is provided a wireless power-transmission apparatus including:

at least one antenna element disposed at a specific position in a three-dimensional space having a predetermined shape and size, to transmit a power transmission beam;

an acquirer to acquire an inclination angle of the antenna element to a plane direction of a reference plane and a height of the antenna element to the reference plane; and a controller to control at least one of antenna power and a power transmission direction of the power transmission beam so that interference power of the power transmission beam toward an outside of the three-dimensional space becomes equal to or smaller than a predetermined allowable value when the antenna element is disposed at the acquired inclination angle and height.

Hereinbelow, embodiments will be explained with reference to the accompanying drawings. In the present specification and the accompanying drawings, for easy understanding and simplicity in drawings, the explanation and drawings are made with omitting, modifying or simplifying part of the configuration. Moreover, in the accompanying drawings of the present specification, for simplicity in drawings and easy understanding, the scale, the ratio of height to width, etc. are modified to be exaggerated from those of actual ones.

First Embodiment

Figure 1:
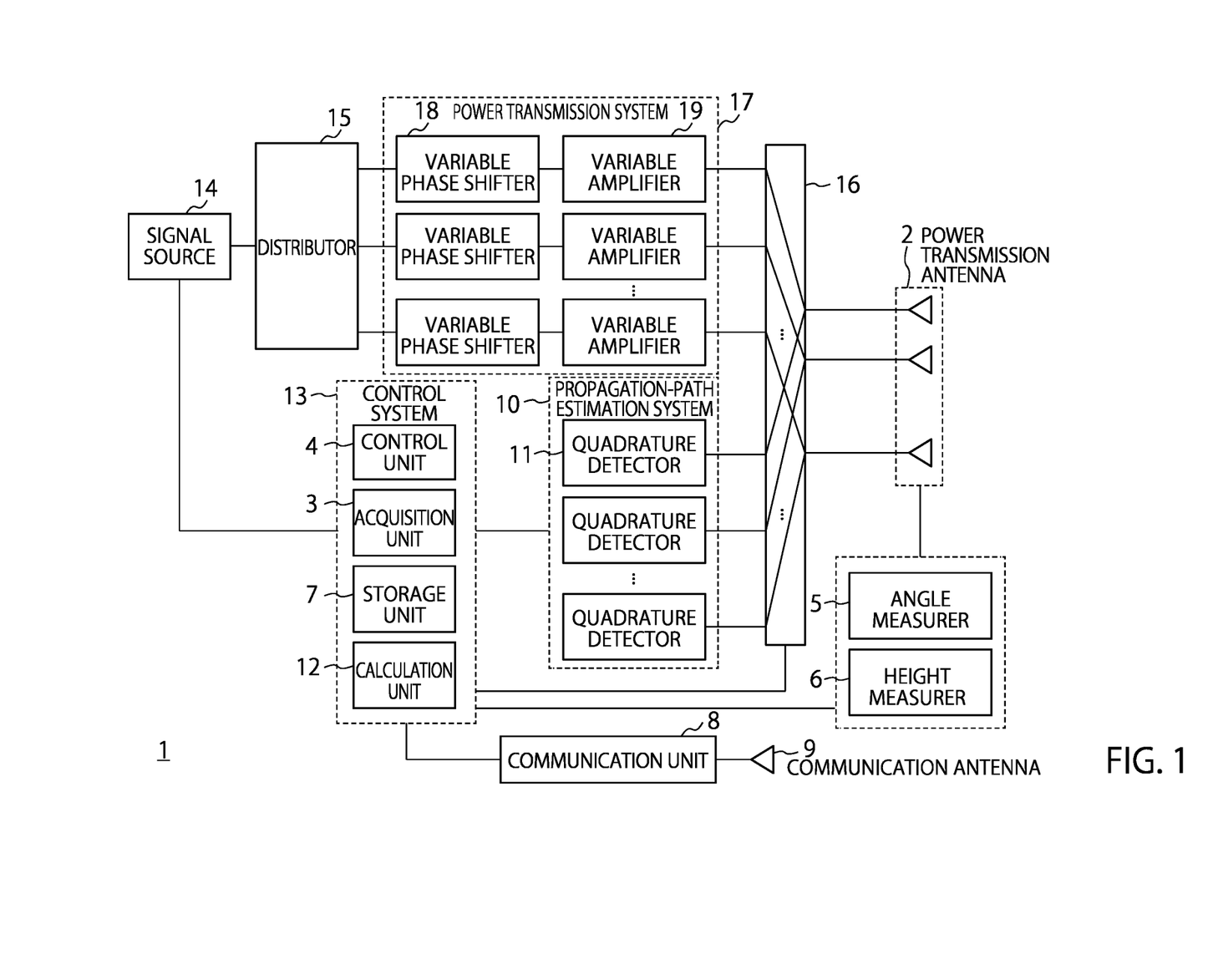
FIG. 1 is a block diagram schematically showing the configuration of a wireless power-transmission apparatus according to a first embodiment.

FIG. 1 is a block diagram schematically showing the configuration of a wireless power-transmission apparatus 1 according to a first embodiment. The wireless power-transmission apparatus 1 of FIG. 1 is provided with a function of transmitting a power transmission beam to a power receiver not shown. The power receiver may, for example, be various sensors. The wireless power-transmission apparatus 1 of FIG. 1 is provided with at least one antenna element (hereinafter, also referred to as a power transmission antenna) 2 for power transmission, an acquisition unit 3, and a control unit 4, as essential components.

The power transmission antenna 2 is disposed at a predetermined position in a three-dimensional space of a predetermined shape and size, to emit a power transmission beam. The three-dimensional space is typically an indoor space of a building. The building may be a business facility such as a factory, or a house. Moreover, the three-dimensional space may have a plurality of partitioned small spaces. The predetermined position may be any position in the three-dimensional space. For example, the power transmission antenna 2 may be disposed at any position on a ceiling surface or a wall surface in the indoor space.

The power transmission antenna 2 may, for example, a phased array antenna, as described later. The phased array antenna has a plurality of antenna elements 2, which can control directivity (power transmission direction and gain) by adjusting the phase of a current of each antenna element 2.

The acquisition unit 3 acquires an inclination angle of the power transmission antenna 2 to a plane direction of a reference plane and a height of the power transmission antenna 2 to the reference plane. The reference plane is, for example, a ground surface or a floor surface. The acquisition unit 3 may acquire an angle measured by an angle measurer 5 that measures the inclination angle of the power transmission antenna 2 and a height measured by a height measurer 6 that measures the height of the power transmission antenna 2. The angle measurer 5 and the height measurer 6 are, for example, directly attached to or arranged in the vicinity of the power transmission antenna 2. The angle measurer 5 can be configured with an acceleration sensor, a gyros sensor, etc. The height measurer 6 can be configured with a laser distance sensor. The angle measurer 5 and the height measurer 6 may not necessarily be provided inside the wireless power-transmission apparatus 1 of FIG. 1.

The acquisition unit 3 may read out to acquire the inclination angle and height of the power transmission antenna 2 stored in the storage unit 7. The storage unit 7 stores the inclination angle and the height after the installation or adjustment of the power transmission antenna 2. Since the power transmission antenna 2 is usually fixed, the inclination angle and the height do not vary after the installation or adjustment. Therefore, at the stage of completion of the installation of the power transmission antenna 2, the inclination angle and height of the power transmission antenna 2 may be stored in the storage unit 7, and then the acquisition unit 3 may read out the inclination angle and height from the storage unit 7, as required.

The reason why the acquisition unit 3 acquires the inclination angle and height of the power transmission antenna 2 is that, when the inclination angle and height of the power transmission antenna 2 vary, the power transmission direction and range of the power transmission beam change. In more specifically, as the inclination angle of the power transmission antenna 2 to the plane direction of the reference plane becomes larger, the power transmission beam is transmitted further away. Moreover, as the height of the power transmission antenna 2 is higher than the reference plane, the received power on the reference plane reduces, although the power transmission range of the power transmission beam becomes wider.

Although the wireless power-transmission apparatus 1 of FIG. 1 is provided with the angle measurer 5, the height measurer 6, and the storage unit 7, these are not essential components. The acquisition unit 3 may acquire the inclination angle and height of the power transmission antenna 2 via any means. For example, the wireless power-transmission apparatus 1 of FIG. 1 may be provided with an input unit not shown, and via the input unit, an inclination angle and a height measured by a measuring device installed separately may be input. Or the inclination angle and height measured by the measuring device installed separately may be fetched in the acquisition unit 3 via wireless or wired connection.

The control unit 4 controls at least one of the antenna power and power transmission direction of the power transmission beam so that the interference power of the power transmission beam toward the outside of the three-dimensional space becomes equal to or smaller than a predetermined allowable value when the power transmission antenna 2 is installed at the inclination angle and height acquired by the acquisition unit 3.

The allowable value is set in accordance with the specification and wireless mode of wireless equipment installed outside the three-dimensional space. The specification and wireless mode of wireless equipment are receiver sensitivity, an allowable interference level decided by the hardware and software of the wireless equipment, or are those restricted in the standards and laws of wireless communication, etc.

The reason why the control unit 4 controls the antenna power of the power transmission beam is that, as the antenna power is larger, the interference power increases. Moreover, the reason why the control unit 4 controls the power transmission direction of the power transmission beam is that, as the power transmission direction of the power transmission beam is more apart from the plane direction of the reference plane, the power transmission beam is transmitted further away. When the interference power of the power transmission beam toward the outside of the three-dimensional space is larger than the allowable value, the antenna power may be set smaller or the power transmission direction of the power transmission beam may be set closer to the plane direction of the reference plane.

In addition to the above, the wireless power-transmission apparatus 1 of FIG. 1 may have a communication unit 8 and a communication antenna 9. The communication unit 8 transmits and receives terminal ID information to and from a power receiver not shown to which power is to be transmitted, receives a power transmission request from the power receiver, and so on, via the communication antenna 9. The communication antenna 9 and the power transmission antenna 2 may be united to each other.

In addition to the above, the wireless power-transmission apparatus 1 of FIG. 1 may have a plurality of quadrature detectors 11 as a plurality of propagation-path estimation systems 10. The wireless power-transmission apparatus 1 of FIG. 1 transmits a signal that instructs transmission of a propagation-path estimation signal, to a power receiver that has made the power transmission request. The power receiver that has received the above-described signal transmits the propagation-path estimation signal. When the propagation-path estimation signal from the power receiver is received by the plurality of power transmission antennas 2, the plurality of quadrature detectors 11 each separate the received propagation-path estimation signal into an in-phase component and a quadrature component to acquire propagation path information of phase and amplitude per system. The conversion of in-phase and quadrature components of each propagation-path estimation signal into the propagation path information of phase and amplitude is performed by a calculation unit 12 in the wireless power-transmission apparatus 1 of FIG. 1. A calculation result of the calculation unit 12 is stored in the storage unit 7. The estimated propagation-path estimation information may be substituted with position and direction information of the power receiver estimated with an arrival direction estimation technique. The acquisition unit 3, the control unit 4, and the storage unit 7 configure the control system 13.

In addition to the above, the wireless power-transmission apparatus 1 of FIG. 1 is provided with a signal source 14 to generate a power-transmission signal and a distributor 15 to distribute the power-transmission signal. Moreover, the wireless power-transmission apparatus 1 of FIG. 1 is provided with a plurality of variable phase shifters 18 and the corresponding plurality of variable amplifiers 19, as a plurality of power transmission systems 17. The plurality of power transmission systems 17, the plurality of propagation-path estimation systems 10, and the plurality of power transmission antennas 2 are connected to a high-frequency switch 16. The high-frequency switch 16 selects whether to transmit the signals from the plurality of power transmission systems 17 to the plurality of power transmission antennas 2 or transmit the received signals from the plurality of power transmission antennas 2 to the plurality of propagation-path estimation systems 10.

The power transmission signal generated by the signal source 14 is distributed by the distributor 15 to the plurality of power transmission systems 17. In each power transmission system 17, the variable phase shifter 18 controls the phase of the power transmission signal and the variable amplifier 19 controls the amplitude of the power transmission signal. In this way, each power transmission system 17 generates a radiation pattern for the power transmission beam. A phase shift value in each variable phase shifter 18 and a gain of each variable amplifier 19 are calculated by the calculation unit 12 based on the propagation path information received by the plurality of propagation-path estimation systems 10. The operation of each component in the wireless power-transmission apparatus 1 of FIG. 1 is controlled by the control unit 4.

In the following, an explanation will be made about the wireless power-transmission apparatus 1 that measures the inclination angle and height of the power transmission antenna 2, with the angle measurer 5 and the height measurer 6, respectively, and changes the power transmission state based on these measurement results, to make the interference power on the outside of the three-dimensional space equal to or smaller than the predetermined allowable value.

Figure 2:
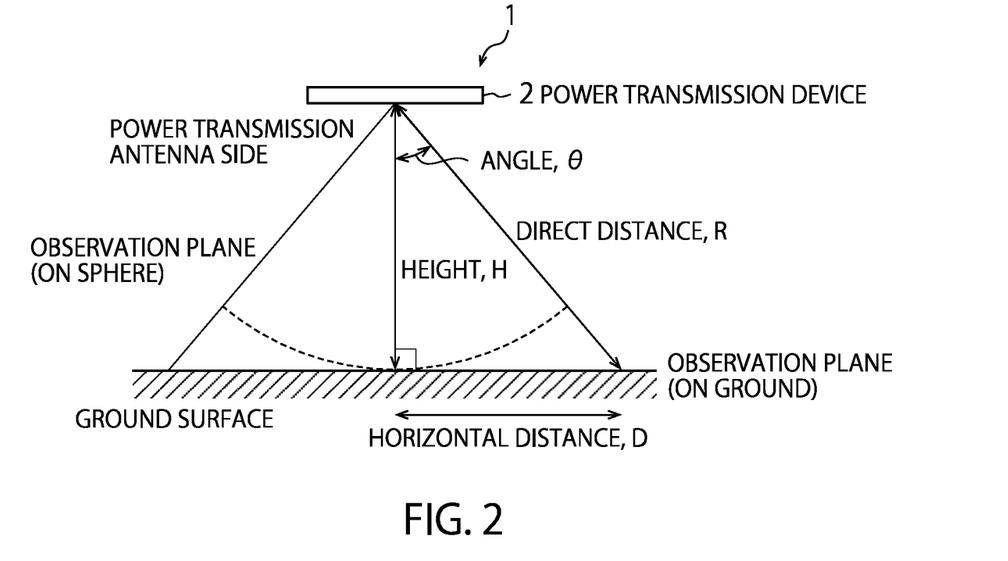
FIG. 2 is a figure showing one operation mode of the wireless power-transmission apparatus 1 according to the first embodiment.

FIG. 2 is a figure showing one operation mode of the wireless power-transmission apparatus 1 according to the first embodiment. A power transmission antenna 2 of FIG. 2 is installed parallel, in its plane direction, to the ground surface at a height H from the ground surface. The power transmission direction of a power transmission beam to be transmitted from the power transmission antenna 2 has an opening angle θ to the direction of normal to the reference plane.

Figure 3:
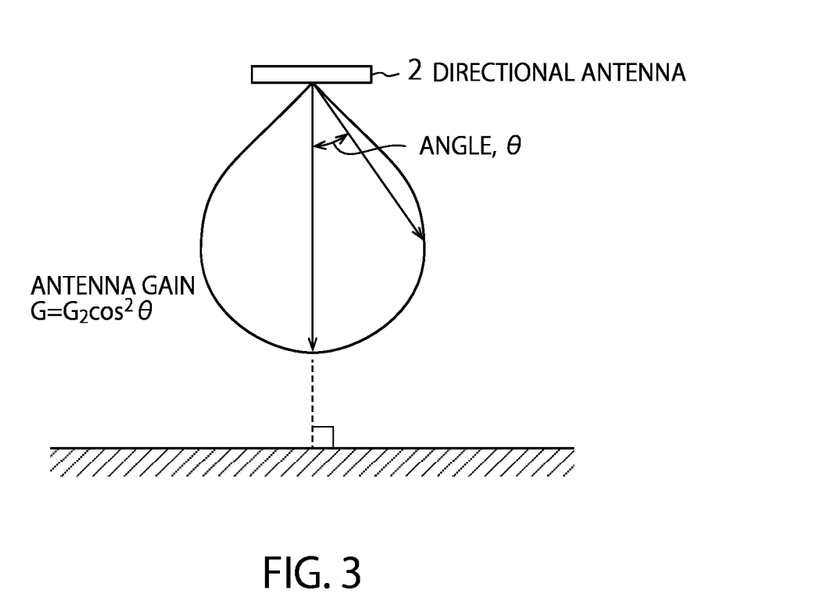
FIG. 3 is a figure showing that a power transmission antenna has directivity in a single direction.

The power transmission antenna 2 of FIG. 2 is, as shown in FIG. 3 in detail, a power transmission antenna 2 having directivity in a single direction. A power radiation pattern G of the power transmission antenna 2 of FIG. 3 can, for example, be expressed by the following expression (1).

$$G = Gi \cos^i \theta \tag{1}$$

In the expression (1), θ is an angle within the range of −90°≤θ≤90°, Gi being a maximum gain of the power transmission antenna 2 in accordance with the order i. As the order i is larger, the radiation pattern has a higher gain and a narrower width, and the maximum gain when i is two is about 7.8 dBi, with a half-value angle of about 90°, showing the characteristics similar to an actual patch antenna. In the following example, the radiation pattern at the order of i=2 is assumed.

In general, an antenna gain is defined on the spherical surface of a sphere that encloses an antenna. However, in a real operation mode, an object to be interfered by radio waves may be present at an almost same height as the antenna. Power density $S_{sphere}$ on a sphere with a radius of H from the antenna is expressed by the following expression (2).

$$S_{shpere} = \frac{KP_{ant}G}{4\pi H^2} = \frac{KP_{ant}G_2\cos^2\theta}{4\pi H^2} \tag{2}$$

In the expression (2), $P_{ant}$ is the total power fed to the power transmission antenna 2, referred to as antenna power, and a constant K is a coefficient in consideration of the influence of radio wave reflection depending on environments. Using the angle θ, the height H of the power transmission antenna 2, and a distance D between the position of a perpendicular line, on the ground surface, from the center of the power transmission antenna 2 to the ground surface, and the position (observation point) of a power transmission beam, on the ground surface, which propagates at the angle θ from the power transmission antenna 2, a direct distance R from the center of the power transmission antenna 2 to the observation point is given by the following expression (3).

$$R = \frac{H}{\cos\theta} = \frac{D}{\sin\theta} = \sqrt{H^2 + D^2} \tag{3}$$

Therefore, the power density observed at the observation point on the ground surface in a direction of the angle θ is given by the following expression (4), using the above-described direct distance R.

$$S_{bottom} = \frac{KP_{ant}G}{4\pi R^2} = \frac{KP_{ant}G}{4\pi\left(\frac{H}{\cos\theta}\right)^2} = \frac{KP_{ant}G_2\cos^4\theta}{4\pi H^2} \tag{4}$$

Figure 4:
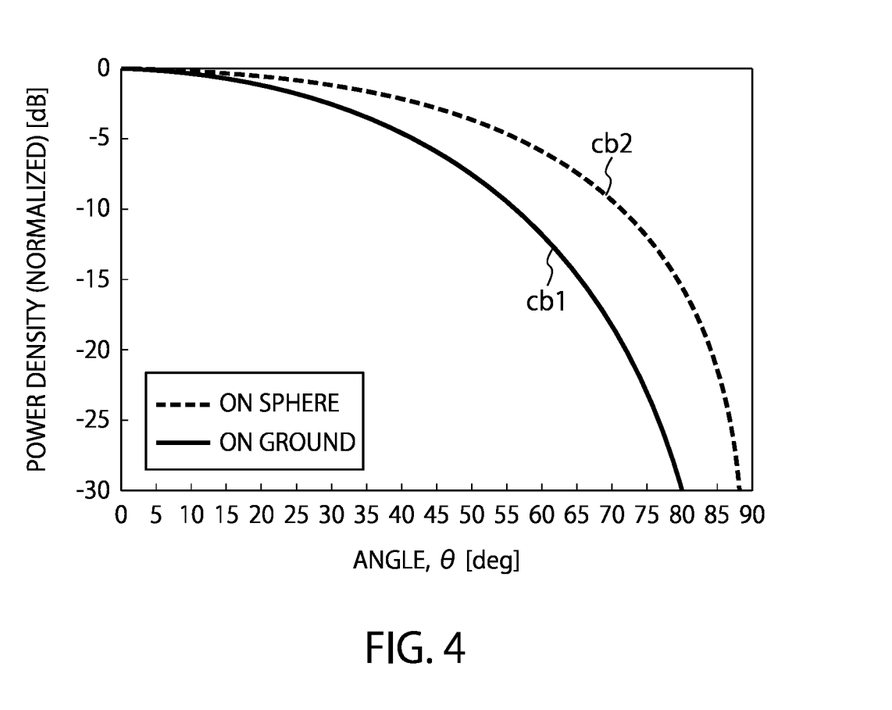
FIG. 4 is a figure showing characteristic curves of power density $S_{sphere}$ and $S_{bottom}$ to an angle $\theta$.

FIG. 4 is a figure showing characteristic curves cb1 and cb2 of power density $S_{sphere}$ and $S_{bottom}$ to the angle θ. The characteristic curves cb1 and cb2 have been normalized with a value of $S_{sphere}$ in the direction of 0°. As understood from the expressions (2) and (4), and FIG. 4, in comparison with the characteristics on the sphere, the power density on the ground surface rapidly reduces on the order of $\cos^4\theta$ as the angle θ increases. Here, the following expression (5) is established between the horizontal distance D, the height H, and the angle θ.

$$D = H \tan\theta \tag{5}$$

When θ is gradually close to 90°, D tends to increase. In other words, as the object to be interfered is further away from the wireless power-transmission apparatus 1 in the direction of the horizontal distance D, it is expected that the influence of interference is reduced.

Figure 5:
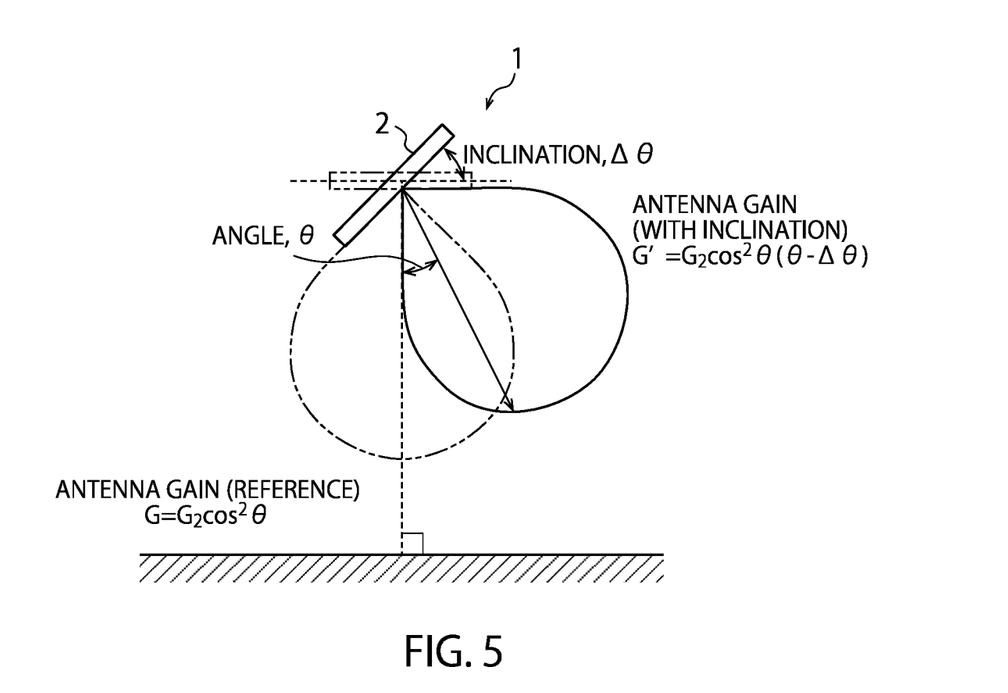
FIG. 5 is a figure explaining an antenna gain of a power transmission antenna.

When the antenna gain at the installation of the antenna of FIG. 3, given by the expression (1), is set as a reference, as shown in FIG. 5, in the case where the power transmission antenna 2 is installed inclined at an inclination angle Δθ to the direction of the ground surface (it is defined that the angle has a positive value in a clockwise direction to the direction of the ground surface), an effective antenna gain G can be expressed by the following expression (6).

$$G' = G_2 \cos^2(\theta - \Delta\theta) \tag{6}$$

However, the expression (6) has a condition of −90°≤θ−Δθ≤90°. Therefore, as the inclination angle is larger, the direction in which the maximum gain is given is oriented further toward the direction of the horizontal distance, and hence radio waves reach further away, so that interference may occur even if an enough distance is taken.

Moreover, as the antenna installation height H becomes higher, the range on the bottom surface where radio waves are radiated becomes wider, and hence the probability of interference increases. Therefore, in order to make it possible to restrict the influence of interference to potentially present objects to be interfered, with no need to grasp their operational states, it is important to control the transmission condition so as to suppress the power density on the outside of a predetermined range within a predetermined value, in accordance with the inclination angle and installation height of the power transmission antenna 2.

As the policy for suppressing the power density on the outside of the predetermined range within the predetermined value, the following expression (7) can be used.

$$P_{int} = \frac{KP_{ant}G_{T_x}G_{R_x}}{L_{pol}L_{obj}L_{path}} \quad (7)$$

The above expression $P_{int}$ expresses the interference power at a given horizontal distance D, calculated based on the Friis transmission equation, K and $P_{ant}$ being as described above, and GTx expressing an antenna gain used in a power transmission apparatus, which is a function depending on the angle θ and the antenna inclination angle Δθ like the expression (6). In practice, a calculation result obtained by electromagnetic simulation or an experimental value obtained by directivity measurements is used as a reference antenna gain.

A sign $GR_x$ expresses an antenna gain of an object to be interfered. Although, in practice, this is also a function that depends on angular information, it is desirable to employ, in calculation here, the antenna-gain maximum value defined in the standards, specifications, laws, etc. with respect to a wireless system that may be an object to be interfered. This is because, for the interference to a wireless system potentially present, the worst conditions should be considered to perform calculation on the assumption of overestimation.

A sign $L_{pol}$ expresses polarization loss between the wireless power-transmission apparatus 1 and the antenna of an object to be interfered. For example, when both have antennas of the same polarization, $L_{pol}$ is 0 dB, whereas, in the case where one has an antenna of linear polarization and the other has an antenna of circular polarization, $L_{pol}$ is 3 dB.

A sign $L_{obj}$ expresses transmission loss caused by an object present in a radio wave path. The transmission loss has a value per object, such as, transmission loss caused by a wall is 17 dB and transmission loss caused by glass is 4 dB.

A sign $L_{path}$ is propagation loss that depends on an optical path length, given by the following expression (8).

$$L_{path} = \left(\frac{4\pi R}{\lambda}\right)^2 \quad (8)$$

In the above expression, λ is the wavelength of a power transmission signal and R is given by the expression (3). In calculation of interference power, besides the Friis transmission equation in the expression (6), a proper channel model can be selected in accordance with the installation environment of the wireless power-transmission apparatus 1.

When the predetermined range (horizontal distance) is $D_{thr}$, by obtaining the maximum value $P_{int,max}$ of the expression (7) in a range equal to or larger than $D_{thr}$, which satisfies the following expression (9) with a predetermined allowable value $P_{thr}$, the interference power on the outside of the predetermined range can be made to fall within the predetermined value.

$$P_{int,max} \leq P_{thr} \quad (9)$$

The value $P_{thr}$ is decided, for example, based on the specifications such as receiver sensitivity and allowable interference level, defined in the standards, specifications, laws, etc. for a wireless system that uses a frequency band (channel) which includes the frequency of a power transmission signal of the wireless power-transmission apparatus 1 or which is in the vicinity of this frequency, and that is deemed to be an object to be interfered. In order to satisfy the condition of the expression (9) with control by the wireless power-transmission apparatus 1, the antenna power $P_{ant}$ or the gain $GT_x$ of the power transmission antenna 2 is varied, as understood from the expression (7).

The antenna power $P_{ant}$ can be varied by controlling the output power of the signal source 14 or the gain of the variable amplifiers 19 of the transmission systems 17, in the wireless power-transmission apparatus 1 of FIG. 1. Therefore, when $P_{int,max}$ exceeds $P_{thr}$, as understood from the expression (7), since $P_{int}$ is a linear function of $P_{ant}$, $P_{ant}$ may be linearly reduced to satisfy the expression (9).

Figure 6:
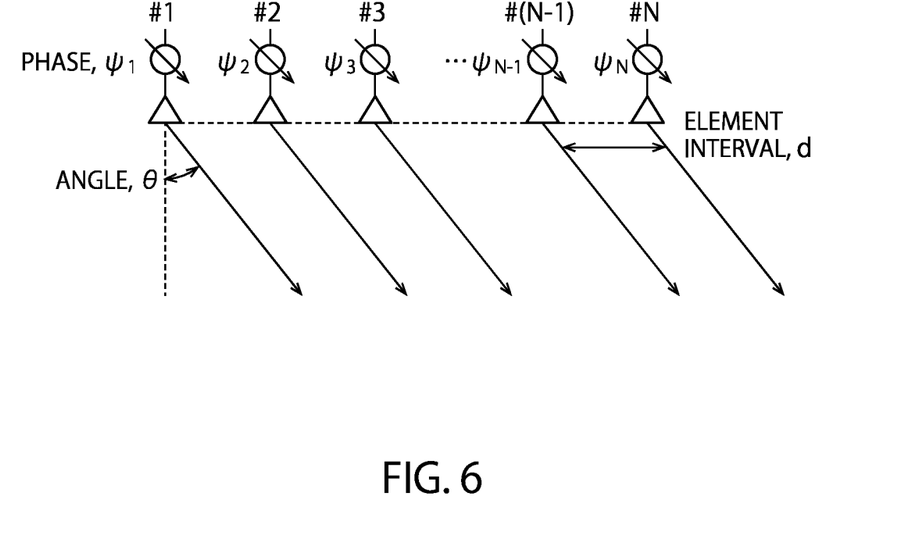
FIG. 6 is a figure showing an operational principle of a phased array antenna having antenna elements arranged on a one-dimensional line.

For the gain $GT_x$ of the power transmission antenna 2, although there are various control methods, a method using a phased array antenna will be explained hereinbelow. The phased array antenna forms a beam having a high gain in a desired direction by appropriately adjusting the phase of a signal supplied to a plurality of arranged antennas. FIG. 6 is a figure showing an operational principle of a phased array antenna having antenna elements 2 arranged on a one-dimensional line. It is defined here that the phased array antenna has N antenna elements 2 and the antennas elements 2 have the same directivity given by the expression (1), with the equal distance d between the adjacent elements. An array gain (power radiation pattern) $G_{array}$ of the phased array antenna is given by the following expression (10) when the phase of a signal supplied to an n-th antenna element 2 is ψn and the amplitude of signals supplied to all antenna elements 2 is equally $1/\sqrt{N}$.

$$G_{array}(\theta) = G(\theta)\left|\sum_{n=1}^{N}\frac{e^{j\psi_n}e^{jk(n-1)d\sin\theta}}{\sqrt{N}}\right|^2 \quad (10)$$

In the expression (10), k is a wavenumber. In the case of maximizing the gain in the direction of a desired angle θ', the phase ψn of the signal supplied to the n-th antenna element 2 is given by the following expression (11).

$$\psi'_n = -k(n-1)d \sin \theta' \quad (11)$$

By putting the above-described expression (11) into the expression (10), the array gain is given by the following expression (12).

$$G_{array}(\theta, \theta') = G(\theta)\left|\sum_{n=1}^{N}\frac{e^{jk(n-1)d(\sin\theta-\sin\theta')}}{\sqrt{N}}\right|^2 = G(\theta)|AF(\theta, \theta')|^2 \quad (12)$$

In the expression (12), the term of total sum in the absolute value is referred to as an array factor AF that is a function depending on the angle θ and the desired angle θ'. The array gain $G_{array}$ is a product of the gain G of a single antenna element 2 and the absolute value squared of the array factor AF.

Figures 7A, 7B, 7C:
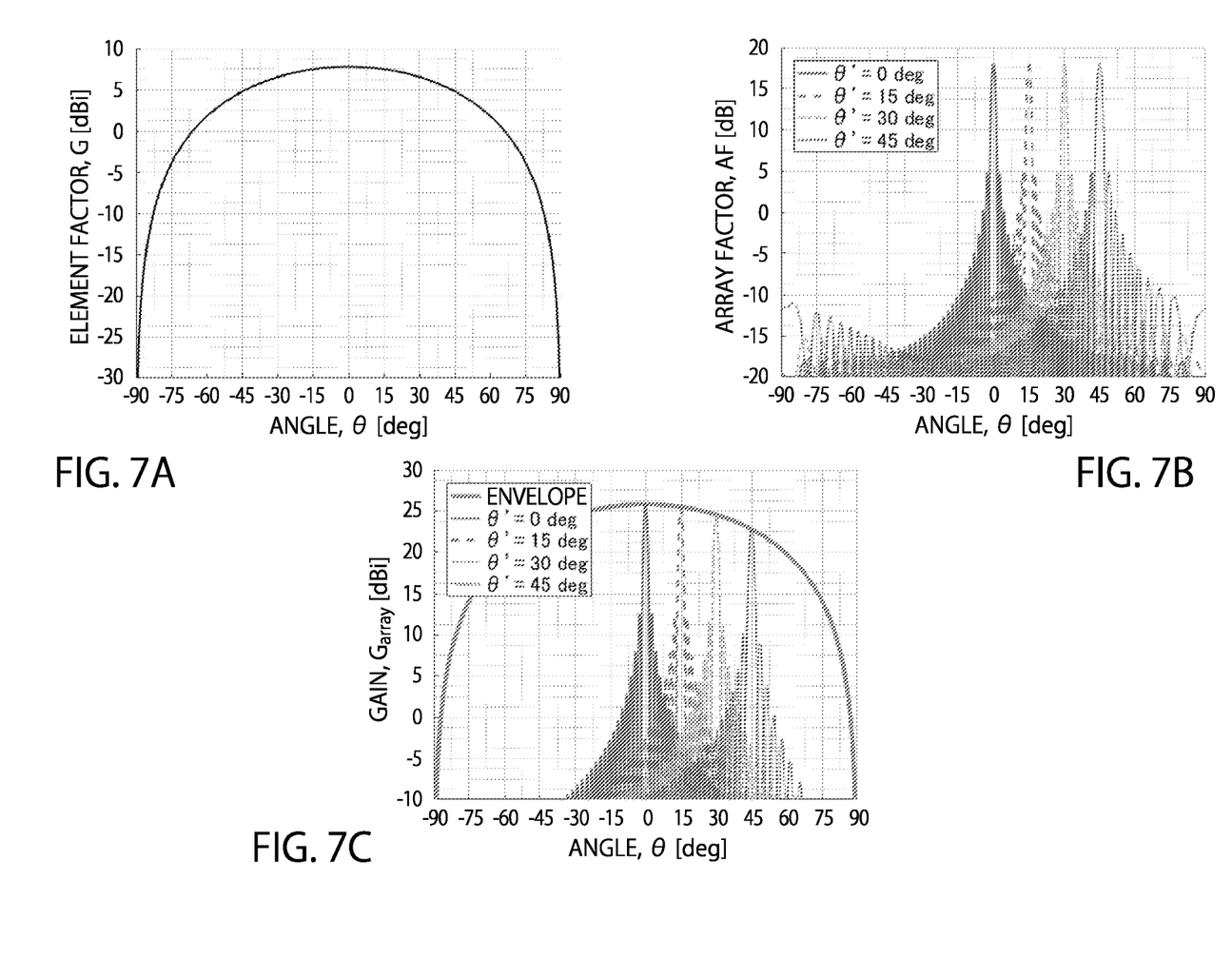
FIG. 7A shows an antenna gain.
FIG. 7B shows an array factor.
FIG. 7C shows an array gain.

FIGS. 7A, 7B and 7C show the results of numerical analysis of the characteristics of antenna gain, array factor and array gain, respectively, to the angle θ. In the numerical analysis, the number of antennas is 64 and the element distance d is set to a half-wavelength. FIG. 7B shows the characteristics at the desired angle θ' in the expression (11) set to 0, 15, 30 and 45 degrees, from which it is found that the array factor is maximized at each desired angle. The array-factor maximum value depends on the number of antennas but takes the same value irrespective of the desired angle. Since the characteristics of FIGS. 7A and 7B are both given in decibel, the array gain of FIG. 7C can be expressed with the sum of the characteristics of antenna gain and array factor in FIGS. 7A and 7B, respectively, in which the envelope that connects the maximum values of array gain at respective angles can be expressed with a pattern that is the sum of the antenna gain and the maximum values of array factor.

According to the above, a transmission gain GTx can also be varied by using the phased array antenna. Therefore, when $P_{int,max}$ exceeds $P_{thr}$, a method which can be employed is to restrict the angle θ' for forming a desired beam in the range that satisfies the expression (9). When the expression (9) cannot be satisfied only by restricting the desired angle θ', the antenna power $P_{ant}$ can also be reduced at the same time.

What is discussed in the above explanation is only the phased array antenna having antenna elements arranged in one dimension with the equal distance therebetween. However, the above discussion can be extended to phased array antennas having antenna elements arranged on two-dimensional plane and on three-dimensional solid, and a phased array antenna of an aperiodic configuration.

As described above, in the first embodiment, since the power transmission direction and interference power of a power transmission beam vary based on the inclination angle and installation height of the antenna elements 2, by using a phased array antenna for which the antenna power and power transmission direction of a power transmission beam are controllable, at least one of the antenna power and power transmission direction of the phased array antenna is controlled so that the interference power to the outside of the three-dimensional space caused by the power transmission beam becomes equal to or smaller than the predetermined allowable value. Accordingly, the interference power to the outside of the three-dimensional space can be restricted to be equal to or smaller than the predetermined allowable value, so that a possible adverse influence of the power transmission beam to wireless communication of wireless equipment arranged on the outside of the three-dimensional space can be reduced. Moreover, since the antenna power and the power transmission direction can be controlled easily by using the phased array antenna, the interference power to the outside of the three-dimensional space can also be relatively easily restricted to be equal to or smaller than the predetermined allowable value.

Second Embodiment

The example explained in the above-described first embodiment is to control at least one of the antenna power and power transmission direction of the power transmission antenna 2 so that the interference power to the outside of the three-dimensional space becomes equal to or smaller than the predetermined allowable value. The three-dimensional space is, for example, an indoor space in which the power transmission antenna 2 is installed. In this case, the power transmission antenna 2 is disposed on the indoor ceiling surface, wall surface, pillars, framework, etc.

Various communication equipment arranged in the same indoors are usually managed by the same administrator, owner or operator. By contrast, in the indoors and outdoors, the administrators, owners or operators are often different from each other. Therefore, the radio waves transmitted and received in the indoor space should be prevented from giving interference to the outdoor communication equipment.

Accordingly, in the present embodiment, the interference to the outdoors is restricted to be equal to or smaller than a predetermined value in such a manner that a power transmission beam is allowed to reach only an end of the indoor space from a position on a reference plane just under the wireless power-transmission apparatus 1 installed in the indoor space.

Figure 8:
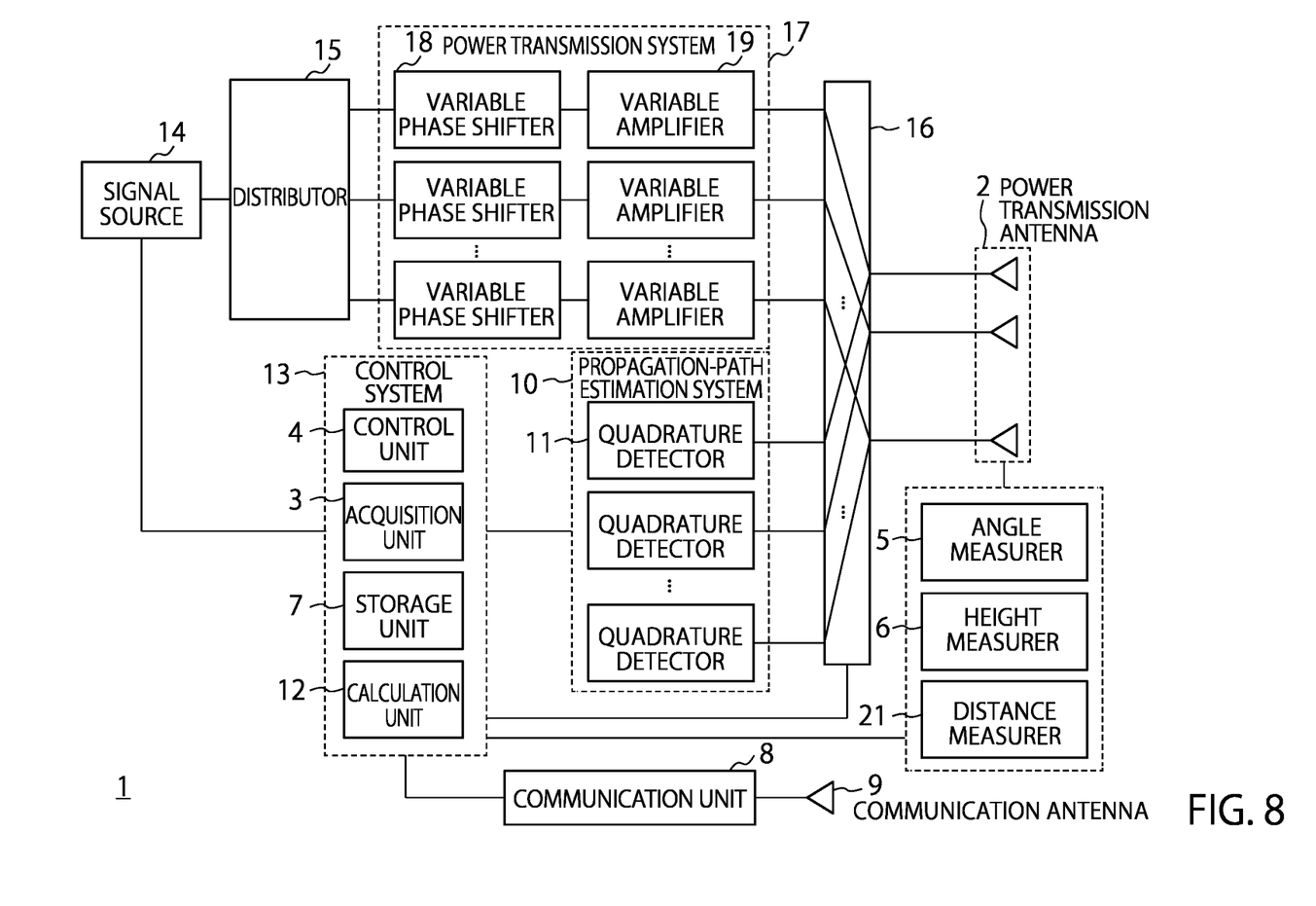
FIG. 8 is a block diagram schematically showing the configuration of a wireless power-transmission apparatus according to a second embodiment.

FIG. 8 is a block diagram schematically showing the configuration of a wireless power-transmission apparatus 1 according to a second embodiment. The wireless power-transmission apparatus 1 of FIG. 8 is provided with a distance measurer 21 added to the configuration of FIG. 1. The distance measurer 21 measures the distance from the wireless power-transmission apparatus 1 to an end of the indoor space. For the distance measurer 21, for example, a laser range finder is used. The end of the indoor space is desirably an end under the worst condition with the maximum interference power. The end is located at any given position of the interface between the indoor space and the outdoors.

The distance measurer 21 is not always necessarily built in the wireless power-transmission apparatus 1. In the installation of the wireless power-transmission apparatus 1 in the indoor space, the distance from the wireless power-transmission apparatus 1 to the end of the indoor space may be measured with a laser range finder or the like and stored in the storage unit 7 of the wireless power-transmission apparatus 1. In this case, the control unit 4 may read out the distance stored in the storage unit 7 to control at least one of the antenna power and power transmission direction of a power transmission beam so that the interference power to the outside of the indoor space becomes equal to or smaller than the allowable value, based on the inclination angle and height of the power transmission antenna 2, and also the above-described distance.

Figure 9:
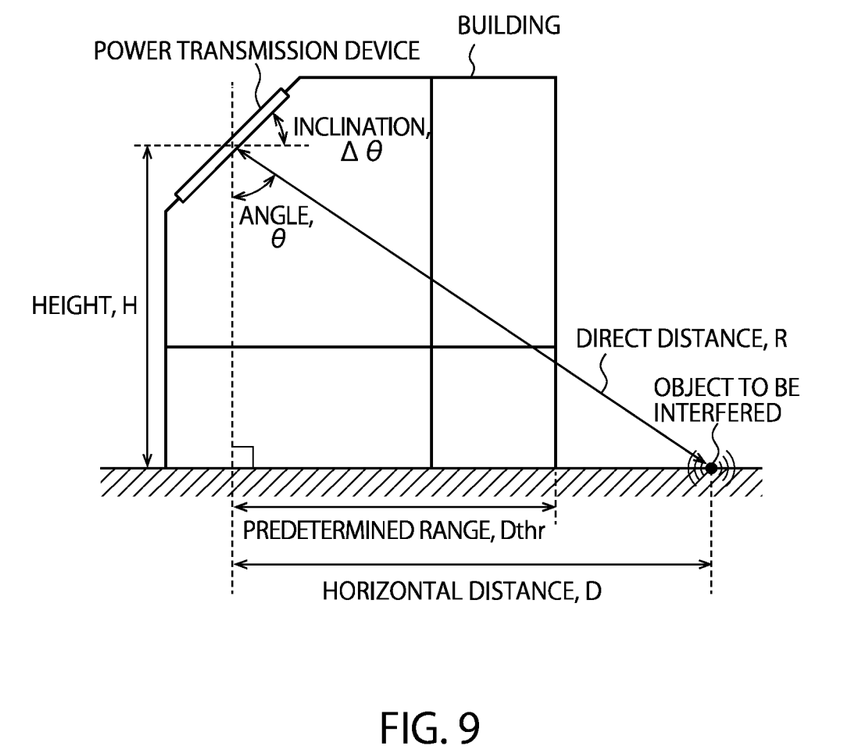
FIG. 9 is a figure showing an example of an indoor space having a plurality of rooms.

In the case where the indoor space includes a plurality of rooms portioned by walls or the like as shown in FIG. 9, a distance measurer 21 such as a laser range finder cannot measure the distance from the wireless power-transmission apparatus 1 to the end of the indoor space. In this case, based on design drawings including information on the size, layout, etc. of the indoor space, the above-described distance may be acquired and stored in the storage unit 7. Moreover, since the transmittance of radio waves varies depending on the materials of the ceiling, wall and floor surfaces, and the like, the transmittance may be predicted from the materials of the wall surfaces and the like, to set the transmission loss $L_{obj}$ in the above-described expression (7). As the value of the transmission loss $L_{obj}$ is larger, the influence of interference to the outside of the indoor space can be reduced further.

As described above, in the second embodiment, the distance from the wireless power-transmission apparatus 1 to the end of the three-dimensional space is detected, and taking the distance into consideration, at least one of the antenna power and power transmission direction of a power transmission beam is controlled. Therefore, the interference power on the outside of the three-dimensional space can be reduced further in consideration of the shape and size of the three-dimensional space and the installation location of the wireless power-transmission apparatus 1 in the three-dimensional space.

Third Embodiment

In the wireless power-transmission apparatuses 1 of the first and second embodiment, the antenna power and/or power transmission direction of a power transmission beam are/is controlled so that the interference power to the outside of the three-dimensional space becomes equal to or smaller than the allowable value. However, there may be cases where the interference power does not become equal to or smaller than the allowable value no matter how the antenna power and/or power transmission direction are/is controlled. In this case, the control unit 4 may forcibly stop power transmission from the power transmission antenna 2. In that case, it may be notified with some means that the interference power does not become equal to or smaller than the allowable value. As for a specific notification means, the notification may be made with sounds or display, or a signal for notification may be transmitted to an administrator's PC or server in a wireless or wired manner.

Moreover, after stopping the transmission of a power transmission beam from the power transmission antenna 2, the control unit 4 may control the antenna power and/or power transmission direction of the power transmission beam to examine whether the interference power becomes equal to or smaller than the allowable value, and if so, restart the transmission of the power transmission beam from the power transmission antenna 2.

As described above, in the third embodiment, in the case where the interference power to the outside of the three-dimensional space does not become equal to or smaller than the allowable value even though the antenna power and/or power transmission direction of the power transmission beam are/is controlled, the transmission of the power transmission beam from the power transmission antenna 2 is forcibly stopped, so that adverse influence of the interference power to wireless equipment on the outside of the three-dimensional space can certainly be prevented.

Fourth Embodiment

A fourth embodiment proposes a positional measure in the case where the interference power does not become equal to or smaller than the allowable value.

Figure 10:
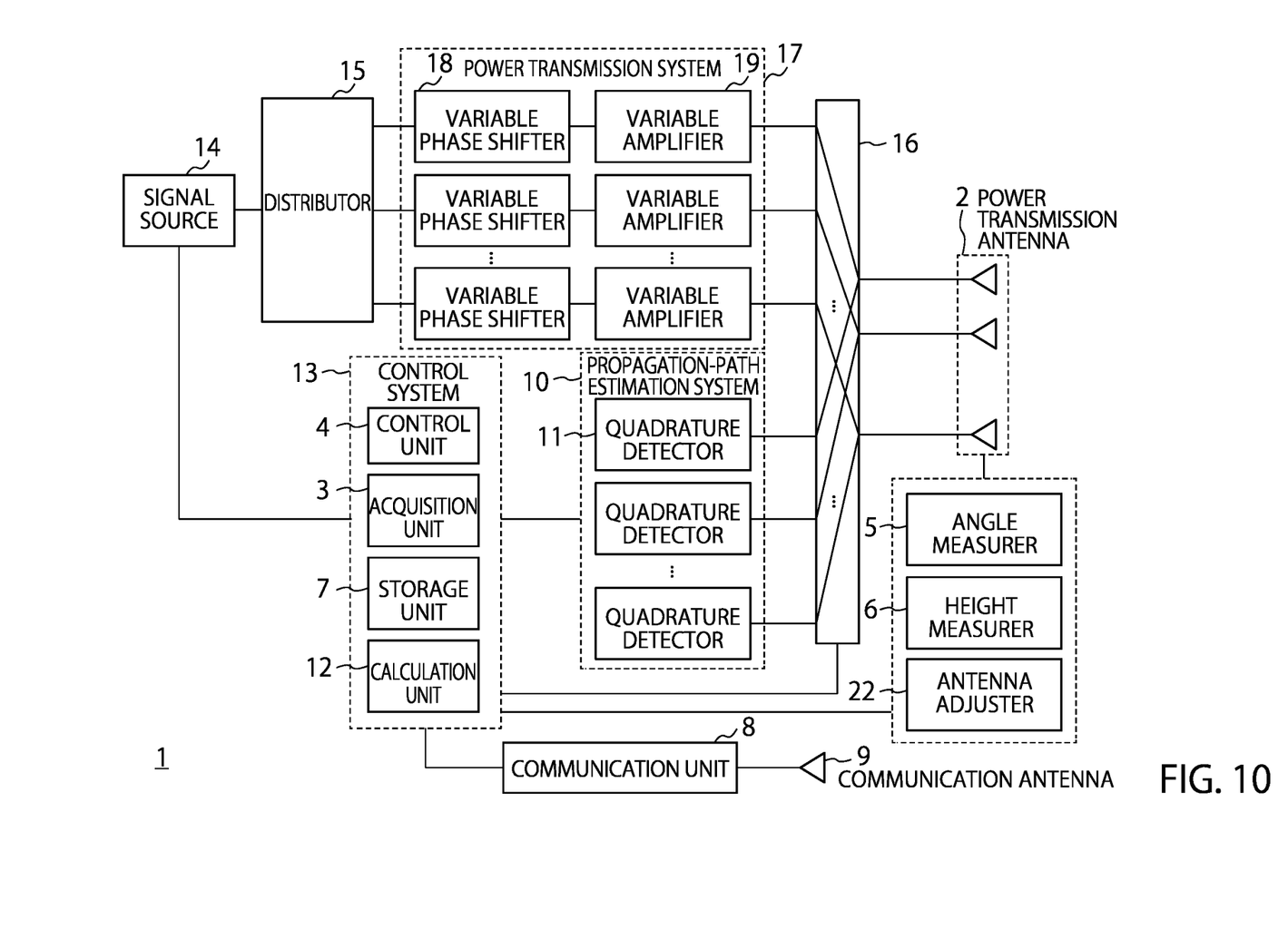
FIG. 10 is a block diagram schematically showing the configuration of a wireless power-transmission apparatus according to a fourth embodiment.

FIG. 10 is a block diagram schematically showing the configuration of a wireless power-transmission apparatus 1 according to the fourth embodiment. The wireless power-transmission apparatus 1 of FIG. 10 is provided with an antenna adjusting unit 22 added to the configuration of FIG. 1. The antenna adjusting unit 22 adjusts at least one of the inclination angle and height of the power transmission antenna 2. The example which will be explained hereinbelow is that the antenna adjusting unit 22 can adjust the inclination angle and the height separately. However, only the inclination angle or only the height may be adjusted, or the inclination angle and the height may be adjusted in linkage with each other.

The antenna adjusting unit 22 has a rotation adjuster capable of varying the inclination angle of the power transmission antenna 2 and an elevation adjuster capable of varying the height of the power transmission antenna 2.

The control unit 4 adjusts at least one of the inclination angle and height of the power transmission antenna 2 using the antenna adjusting unit 22 in the case where the interference power does not become equal to or smaller than the allowable value even though at least one of the antenna power and power transmission direction of the power transmission beam is controlled. As described above, as the inclination angle of the power transmission antenna 2 to the direction of the reference plane is larger, the power transmission beam is transmitted further away. Therefore, in order to restrict the interference power, it is preferable to make the inclination angle as smaller as possible. Moreover, as the height of the power transmission antenna 2 is higher, the power transmission range of the power transmission beam becomes wider. Therefore, in order to restrict the interference power, it is preferable to make lower the height of the power transmission antenna 2.

Furthermore, the control unit 4 may freely control, with no priority, at least one of the antenna power and power transmission direction of the power transmission beam, and at least one of the inclination angle and height of the power transmission antenna 2, so that the interference power becomes equal to or smaller than the predetermined allowable value.

As described above, the fourth embodiment is provided with the antenna adjuster 22 that adjusts at least one of the inclination angle and height of the power transmission antenna 2. Therefore, the interference power can be made equal to or smaller than the predetermined allowable value even in the case where the interference power does not become equal to or smaller than the predetermined allowable value only by control of the antenna power and/or power transmission direction of the power transmission beam, so that the frequency of forcibly stopping the power transmission beam from the power transmission antenna 2 can be reduced.

Fifth Embodiment

The wireless power-transmission apparatus 1 in each of the first to fourth embodiments is to prevent the adverse influence of the power transmission beam from the power transmission antenna 2 to the wireless equipment installed on the outside of the three-dimensional space. However, practically, the magnitude of interference power leaked to the outside of the three-dimensional space varies depending on the shape, size, presence or absence of partitions, materials of walls, ceilings, etc. of the three-dimensional space where the wireless power-transmission apparatus 1 is installed.

Figure 11:
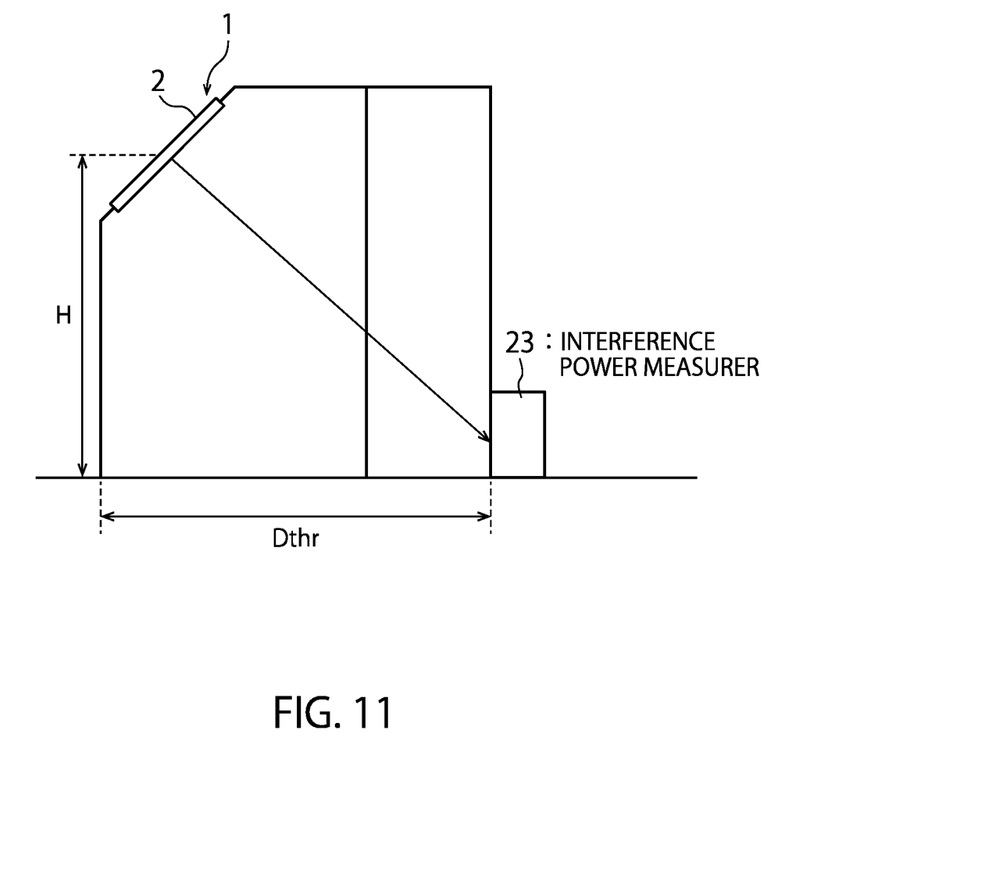
FIG. 11 is a figure showing an example of installation of an interference power measurer at an end of a three-dimensional space.

Accordingly, as shown in FIG. 11, an interference power measurer 23 for measuring the interference power may be installed at an end of the three-dimensional space. The interference power measurer 23 measures the interference power at that position. FIG. 11 shows an example of installation of the interference power measurer 23 only at one location of the end of the three-dimensional space. However, the interference power measurer 23 may be installed at each of a plurality of locations. In particular, when there is a member such as glass which radio waves easily pass through, it is desirable to install the interference power measurer 23 in the vicinity of that member.

The interference power measured by the interference power measurer 23 is transmitted to the control unit 4 in a wired or wireless manner. The control unit 4 controls at least one of the antenna power and power transmission direction of the power transmission beam so that the interference power measured by the interference power measurer 23 becomes equal to or smaller than a predetermined allowable value. Moreover, as explained in the fourth embodiment, the control unit 4 may control at least one of the inclination angle and height of the power transmission antenna 2.

As described above, in the fifth embodiment, the interference power measurer 23 installed at the end of the three-dimensional space measures interference power at that location and compares the measured interference power with the allowable value, so that it is accurately determined whether the interference power is equal to or smaller than the allowable value.

While certain embodiments have been described, these embodiments have been presented by way of example only, and are not intended to limit the scope of the inventions.

Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless power-transmission apparatus comprising:
at least one antenna element disposed at a specific position in an indoor space having a predetermined shape and size, to transmit a power transmission beam;
an acquirer to acquire at least one of an inclination angle of the antenna element to a plane direction of a reference plane and a height of the antenna element to the reference plane; and
a controller to notify that interference power to the indoor space is larger than a predetermined allowable value when the interference power is larger than the predetermined allowable value based on at least one of the acquired inclination angle and height.

2. The wireless power transmission apparatus according to claim 1, wherein the controller controls at least one of the antenna power or power transmission direction of the power transmission beam when the at least one of antenna element is disposed at at least one of the acquired inclination angle and height.

3. The wireless power transmission apparatus according to claim 1, wherein the controller makes notification when the interference power becomes larger than the allowable value even if at least one of the antenna power or power transmission direction of the power transmission beam is controlled.

4. The wireless power-transmission apparatus of claim 1, wherein the allowable value is set in accordance with a specification of and a wireless mode of wireless equipment installed outside the indoor space.

5. The wireless power-transmission apparatus of claim 1, wherein the antenna element is a phased array antenna having a plurality of antenna elements, the phased array antenna being capable of adjusting the power transmission direction and a gain of the power transmission beam,
wherein the controller notifies that interference power to the indoor space is larger than a predetermined allowable value, when the interference power is larger than the predetermined allowable value, and the phased array antenna is disposed at at least one of the acquired inclination angle and height.

6. The wireless power-transmission apparatus of claim 1, wherein the indoor space is provided with the antenna element installed therein,
wherein the controller notifies that interference power to the indoor space is larger than a predetermined allowable value when the interference power is larger than the predetermined allowable value based on at least one of the inclination angle and height acquired by the acquirer and at least one information of at least one of shape, size, or layout of the indoor space, at least one material of ceiling, wall, or floor surface in the indoor space, or transmittance of radio waves on at least one of the ceiling, wall, or floor surface in the indoor space.

7. The wireless power-transmission apparatus of claim 1, wherein the controller stops transmission of the power transmission beam from the antenna element when the interference power of the power transmission beam toward the outside of the indoor space is larger than the allowable value even though at least one of the antenna power or power transmission direction of the power transmission beam is controlled.

8. The wireless power-transmission apparatus of claim 1 further comprising an antenna adjuster to adjust at least one of the inclination angle or height of the antenna element,
wherein the controller notifies that interference power to the indoor space is larger than a predetermined allowable value when the interference power is larger than the predetermined allowable value.

9. The wireless power-transmission apparatus of claim 1 further comprising an interference power measurer to measure the interference power at an end of the indoor space,
wherein the controller notifies that interference power to the indoor space is larger than a predetermined allowable value when the interference power is larger than the predetermined allowable value.

10. The wireless power-transmission apparatus of claim 1 further comprising:
an angle measurer to measure an inclination angle of the antenna element; and
a height measurer to measure a height of the antenna element,
wherein the acquirer acquires the inclination angle measured by the angle measurer and the height measured by the height measurer.

11. The wireless power-transmission apparatus of claim 1, further comprising a storage unit to store at least one of an inclination angle and a height of the antenna element after installation or adjustment of the antenna element,
wherein the acquirer acquires at least one of the inclination angle and height stored in the storage unit.

12. A wireless power-transmission method comprising:
acquiring at least one of an inclination angle of at least one antenna element to a plane direction of a reference plane or a height of the antenna element to the reference plane, the antenna element being disposed at a specific position in an indoor space having a predetermined shape and size, to transmit a power transmission beam; and
notifying that interference power to the indoor space is larger than a predetermined allowable value when the interference power is larger than the predetermined allowable value, based on at least one of the acquired inclination angle and height.

13. The wireless power transmission method according to claim 12, wherein at least one of the antenna power or power transmission direction of the power transmission beam is controlled when the at least one of antenna element is disposed at at least one of the acquired inclination angle and height.

14. The wireless power transmission method according to claim 12, wherein notification is made when the interference power becomes larger than the allowable value even if at least one of the antenna power or power transmission direction of the power transmission beam is controlled.

15. The wireless power-transmission method of claim 12, wherein the allowable value is set in accordance with a specification of and a wireless mode of wireless equipment installed outside the indoor space.

16. The wireless power-transmission method of claim 12, wherein the antenna element is a phased array antenna having a plurality of antenna elements, the phased array antenna being capable of adjusting the power transmission direction and a gain of the power transmission beam,
wherein the notifying notifies that interference power to the indoor space is larger than a predetermined allowable value when the interference power is larger than the predetermined allowable value, and the phased array antenna is disposed at at least one of the acquired inclination angle and height.

17. The wireless power-transmission method of claim 12, wherein the indoor space is provided with the antenna element installed therein,
   wherein the notifying notifies that interference power to the indoor space is larger than a predetermined allowable value when the interference power is larger than the predetermined allowable value based on at least one of the acquired inclination angle and height, and at least one information of at least one of shape, size, or layout of the indoor space, at least one material of ceiling, wall, or floor surface in the indoor space, or transmittance of radio waves on at least one of the ceiling, wall, or floor surface in the indoor space.

18. The wireless power-transmission method of claim 12, wherein transmission of the power transmission beam from the antenna element is stopped when the interference power of the power transmission beam toward the outside of the indoor space is larger than the allowable value even though at least one of the antenna power or power transmission direction of the power transmission beam is controlled.

19. The wireless power-transmission method of claim 12, further comprising:
   adjusting at least one of the inclination angle or height of the antenna element,
   wherein the notifying notifies that interference power to the indoor space is larger than a predetermined allowable value when the interference power is larger than the predetermined allowable value.

20. A wireless system, comprising:
a wireless power-transmission apparatus; and
a power receiver that receives a power transmission beam,
wherein the wireless power transmission apparatus comprises:
   at least one antenna element disposed at a specific position in an indoor space having a predetermined shape and size, to transmit a power transmission beam,
   an acquirer to acquire at least one of an inclination angle of the antenna element to a plane direction of a reference plane and a height of the antenna element to the reference plane, and
   a controller to notify that interference power to the indoor space is larger than a predetermined allowable value when the interference power is larger than the predetermined allowable value based on at least one of the acquired inclination angle and height.

* * * * *